Jan. 10, 1956  T. F. MOFFETT  2,729,912
CHUM BASKET
Filed April 15, 1954

INVENTOR.
Thomas F. Moffett
BY *Victor J. Evans Co.*
ATTORNEYS

United States Patent Office 2,729,912
Patented Jan. 10, 1956

2,729,912

CHUM BASKET

Thomas F. Moffett, Trenton, N. J.

Application April 15, 1954, Serial No. 423,323

2 Claims. (Cl. 43—44.99)

This invention relates to fishing equipment, and more particularly to a chum basket for holding and distributing fish attracting bait or chum.

The object of the invention is to provide a chum basket which will permit chum or bait to be distributed below the water level to thereby attract fish towards a fishhook.

Another object of the invention is to provide a chum basket which can be used for deep sea fishing as well as shallow fishing, and wherein there will be no chum or bait wasted during use of the assembly.

A further object of the invention is to provide a chum holding assembly which is extremely simple and inexpensive to manufacture.

Other objects and advantages will be apparent during the course of the following description.

In the accompanying drawings, forming a part of this application, and in which like numerals are used to designate like parts throughout the same:

Figure 1:
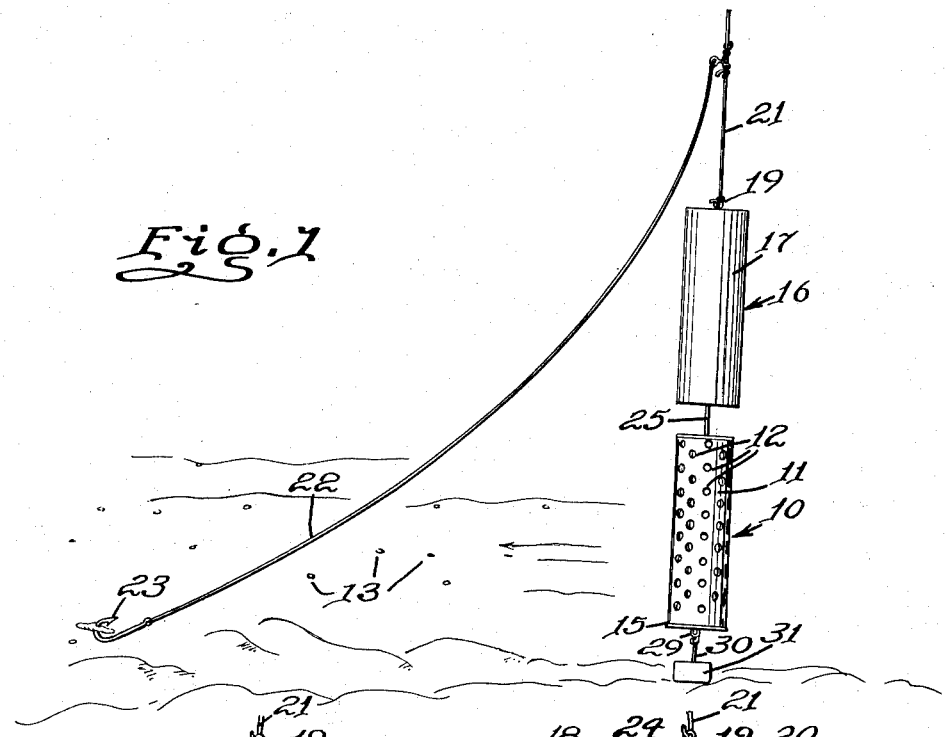
Figure 1 is a side elevational view showing the chum distributing assembly of the present invention being used.

Referring in detail to the drawings, the numeral 10 designates a basket for holding chum or bait 13, and the basket 10 includes an annular side wall 11 which is provided with a plurality of apertures or openings 12. When the basket 10 is in the position shown in Figure 1 the chum 13 will pass from the interior of the basket 10 out through the openings 12. The basket 10 is further provided with a bottom wall 14, and the outer peripheral edge of the bottom wall 14 extends beyond the side wall 11 to define an annular lip or flange 15.

There is further provided a shield 16 which is hollow, and the shield 16 slidably or telescopically receives therein the basket 10. The shield 16 includes an annular side member 17 and a top member 18, the bottom of the shield 16 being open. The top 18 of the shield 16 is provided with a vent opening 20, Figure 3, whereby the basket 10 can be easily removed from or inserted in the shield 16 without the creation of a vacuum.

Secured to the upper surface of the top 18 of the shield 16 is a ring member 19, and a fishing line 21 has one end connected to the ring member 19. A line 22 may be connected to the fishing line 19, and a fishhook 23 is connected to the line 22 as shown in Figure 1. Thus, the chum or bait 13 will pass through the apertures 12 and be carried by the current past the fishhook 23 so that fish will be attracted to the fishhook 23.

Secured to the inner surface of the top 18 of the shield 16 is a ring member 24, and a line 25 has its upper end connected to the ring member 24. The line 25 extends through a central aperture or opening 26 in a lid 28, and the lower end of the line 25 is connected to a ring member 27 which is secured to the bottom wall 14 of the basket 10. The lid or cap 28 is detachably mounted on top of the basket 10 so that the lid 28 can be removed when the basket is to be filled with chum or bait.

Secured to the lower surface of the bottom wall 14 and arranged outside of the basket 10 is a ring member 29, and a line 30 is connected to the ring member 29. The line 30 is also connected to a weight 31 as shown in Figure 1.

From the foregoing it is apparent that there has been provided a chum basket 10 which has a retaining shield 16 whereby chum for attracting fish can be lowered in the ocean, bay, river, or lake without loss of chum while the basket is descending. The chum may consist of ground up bait. Ordinarily when attempting to lower chum in an ordinary chum pot or bucket, much of the chum is lost or wasted due to movement of the container through the water. Since much fishing is done in deep water, this loss of chum while the basket is descending results in an empty or nearly empty chum basket and thereby renders the basket useless. The present invention includes the retaining shield 16 which prevents the loss of chum since the shield remains in position over the chum basket 10 until the tension line 21 lifts the retaining shield 16 from the basket 10 when slack is removed from the fishing line 21. The chum then breaks up and is distributed slowly from the basket 10 through the holes 12 to create a narrow stream or slick of tiny food particles as indicated by the numeral 13 in Figure 1 and these particles 13 drift down current from the chum basket. Since fish naturally feed upon food drifting down to them, the fish will be attracted to this slick or line of chum 13 and since the tiny particles 13 are not large enough to satisfy the appetite of the fish, the fish will work up current in search of larger particles of food so that the fish will be brought to the baited hook 23 which assumes its normal position some inches downstream from the chum basket 10.

Figure 3:
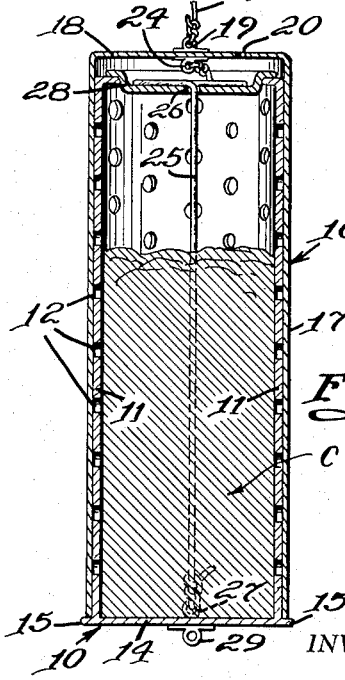
Figure 3 is a longitudinal sectional view taken through the assembly in the position of Figure 2.

Since the basket 10 and shield 16 are light in weight, there will be no heavy drag created on the line. Additional weight 31 is added and the amount of the weight 31 can be varied depending upon the depth of water being fished and the amount of current or sea running. The present invention can be used in different sizes according to whether it is to be used for deep sea, shallow bay, rivers or shallow inland bodies of water. Although the parts are not restricted to being cylindrical in shape, it is believed that a cylindrical shape with a diameter approximately one-fourth of its length is the most practical configuration. The parts can be made of any suitable material such as metal, plastic or the like. In use after filling the basket 10 with chum, the chum basket lid 28 is pushed into position and the retaining shield 16 with the upper portion of the tension line 25 inside is slid down over the basket 10 until the shield seats against the lip 15. After the device reaches the bottom with all of the chum still enclosed in the basket 10, slack is removed to cause the tension line 25 to raise the shield 16 and thereby uncover the bait distributing holes 12. This causes a thin line of chum 13 to drift down current. The tension line 25 is of strong acid resistant material and has one end connected to the ring 27 and its other end connected to the ring 24. The lid 28 is provided with an opening 26 so that when the retaining shield 16 is slid up, the lid 28 may be easily removed when the basket is to be refilled. The weight 31 may provide a sinker or additional weight. The air hole 20 prevents pressure on the chum when seating the shield 16. All strain on the assembly is in a straight line from the ring 29 to the ring 19 which insures that the unit will be rugged and durable. In Figure 3, the letter C designates the chum material.

Figure 2:
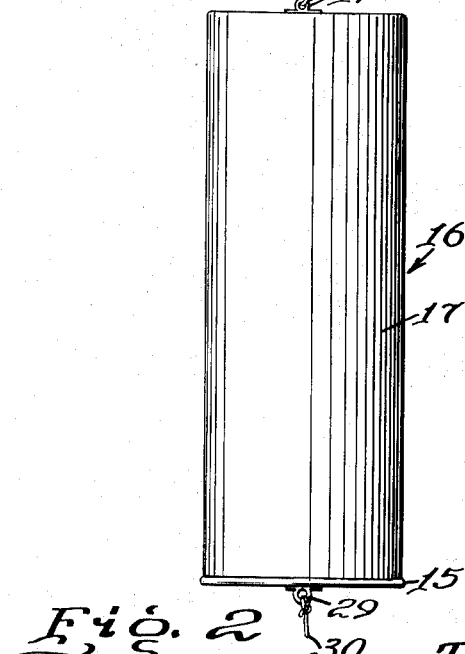
Figure 2 is a side elevational view showing the basket retracted within the shield.

Figure 2 shows the position of the parts when the unit is being lowered into the water while Figure 1 shows the position of the parts when the shield is removed from the basket by removing slack from the fishing line 21.

What is claimed:

1. In a chum holding and distributing assembly, a basket including a cylindrical side wall provided with a plurality of spaced apertures, a bottom wall on the lower end of said basket, a ring member secured to the lower surface of said bottom wall, a line connected to said ring member, a weight connected to said line, there being an opening in the top of said basket, a lid detachably closing said opening and provided with a central aperture, a tubular shield slidably receiving said basket and including an annular side member and a top member, the outer peripheral edge of said bottom wall providing an annular lip for selective engagement by the side member of said shield, a line extending through the aperture in said lid and having one end connected to the top of said shield and its other end connected to the bottom wall of said basket, a fishing line connected to the outer surface of the top of said shield, a line extending from said fishing line, and a fishhook connected to said last named line.

2. In a chum holding and distributing assembly, a basket including a side wall provided with a plurality of spaced apertures, a bottom wall on the lower end of said basket, a line connected to said bottom wall, a weight connected to said line, there being an opening in said basket, a lid detachably closing said opening and provided with an aperture, a shield slidably receiving said basket and including an annular side member and a top member, the outer peripheral edge of said bottom wall providing an annular lip for selective engagement by the side member of said shield, a line extending through the aperture in said lid and having one end connected to the top of said shield and its other end connected to the bottom wall of said basket, a fishing line connected to the top of said shield, a line extending from said fishing line, and a fishhook connected to said last named line.

References Cited in the file of this patent

UNITED STATES PATENTS

| | | |
|---|---|---|
| 758,434 | Forster | Apr. 26, 1904 |
| 1,807,712 | Spofford | June 2, 1931 |
| 2,634,450 | Nelson et al. | Apr. 14, 1953 |